(12) United States Patent
Mehdad et al.

(10) Patent No.: US 11,010,687 B2
(45) Date of Patent: May 18, 2021

(54) DETECTING ABUSIVE LANGUAGE USING CHARACTER N-GRAM FEATURES

(71) Applicant: Oath Inc., New York, NY (US)

(72) Inventors: Yashar Mehdad, San Jose, CA (US); Joel Tetreault, New York, NY (US)

(73) Assignee: Verizon Media Inc., New York, NY (US)

( * ) Notice: Subject to any disclaimer, the term of this patent is extended or adjusted under 35 U.S.C. 154(b) by 723 days.

(21) Appl. No.: 15/224,434

(22) Filed: Jul. 29, 2016

(65) Prior Publication Data

US 2018/0032907 A1    Feb. 1, 2018

(51) Int. Cl.
 *G06N 20/00* (2019.01)
 *G06F 16/24* (2019.01)
 *G06F 40/211* (2020.01)
 *G06F 16/2457* (2019.01)

(52) U.S. Cl.
 CPC ....... *G06N 20/00* (2019.01); *G06F 16/24578* (2019.01); *G06F 40/211* (2020.01)

(58) Field of Classification Search
 CPC .. G06N 20/00; G06F 16/24578; G06F 17/271
 See application file for complete search history.

(56) References Cited

U.S. PATENT DOCUMENTS

| | | | |
|---|---|---|---|
| 6,167,369 A * | 12/2000 | Schulze | G06F 17/275 704/10 |
| 8,219,401 B1 | 7/2012 | Pettay et al. | |
| 9,043,944 B2 | 5/2015 | Ronaldi | |
| 9,588,958 B2 * | 3/2017 | Danielyan | G06F 17/2755 |
| 2012/0271627 A1 * | 10/2012 | Danielyan | G06F 17/2755 704/9 |
| 2015/0032443 A1 * | 1/2015 | Karov | G06F 16/36 704/9 |
| 2015/0088897 A1 * | 3/2015 | Sherman | G06F 16/958 707/740 |
| 2015/0154289 A1 * | 6/2015 | Revesz | H04L 51/12 707/740 |

(Continued)

FOREIGN PATENT DOCUMENTS

WO    WO-2017162919 A1 *    9/2017 ............. H04L 51/12

OTHER PUBLICATIONS

Chen et. al., Detecting Offensive Language in Social Media to Protect Adolescent Online Safety, 2012 (Year: 2012).*

(Continued)

*Primary Examiner* — Li B. Zhen
*Assistant Examiner* — Selene A. Haedi
(74) *Attorney, Agent, or Firm* — Cooper Legal Group, LLC

(57) ABSTRACT

Methods and apparatus for detecting abusive language are disclosed. In one embodiment, a set of character N-grams is ascertained for a set of text. Feature values for a plurality of features of the set of text are determined, based, at least in part, on the set of character N-grams. A computer-generated model is applied to the feature values for the plurality of features to generate a score for the set of text, where the model includes a plurality of weights, each of the weights corresponding to one of the features. It may then be determined whether the set of text includes abusive language based, at least in part, on the score.

20 Claims, 5 Drawing Sheets

(56) References Cited

U.S. PATENT DOCUMENTS

2017/0061248 A1* 3/2017 Ryan, Jr. .............. G06K 9/6257
2017/0147682 A1* 5/2017 Alaqeeli ............. G06F 17/2211

OTHER PUBLICATIONS

Liu, Bing, "Sentiment analysis and opinion mining," Synthesis Lectures on Human Language Technologies, Morgan & Claypool Publishers, May 2012.
Brody, Samuel et al., "Cooolll!!! Using word lengthening to detect sentiment in microblogs," Proceedings of the 2011 Conference on Empirical Methods in Natural Language Processing, pp. 562-570, Jul. 2011.
Buhrmester, Michael et al., "Amazon's Mechanical Turk: a new source of inexpensive, yet high-quality, data?" Perspectives on Psychological Science, 6(1):3-5, Jan. 2011.
Chen, Ying et al., "Detecting offensive language in social media to protect adolescent online safety," Proceedings of the 2012 International Conference on Privacy, Security, Risk and Trust (PASSAT) and the 2012 International Conference on Social Computing (SocialCom), Sep. 3-5, 2012, pp. 71-80.
Chen, Ying et al., "Social media to protect adolescent online safety," Proceedings of the 2012 International Conference on Privacy, Security, Risk and Trust (PASSAT) and the 2012 International Conference on Social Computing (SocialCom), Sep. 3-5, 2012, abstract.
Dadvar, Maral et al., "Improving cyberbullying detection with user context," Advances in Information Retrieval, 2013, pp. 693-696.
Djuric, Nemanja et al., "Hate speech detection with comment embeddings," WWW 2015 Companion, May 18-22, 2015.
Djuric, Nemanja et al., "Hierarchical neural language models for joint representation of streaming documents and their content," WWW 2015, May 18-22, 2015.
Faruqui, Manaal et al., "Non-distributional word vector representations," Proceedings of the $53^{rd}$ annual meeting of the Association for Computational Linguistics and the $7^{th}$ International Joint Conference on Natural Language Processing (vol. 2: short papers), pp. 464-469, Jul. 2015.
Horton, John J. et al., "The Online Laboratory: conducting experiments in a real labor market," Faculty Research Working Paper Series, National Bureau of Economic Research, Cambridge, Mass., Apr. 2010.
Laboreiro, Gustavo et al., "What we can learn from looking at profanity," Computational Processing of the Portuguese Language, vol. 8775, (2014), Lecture Notes in Computer Science, pp. 108-113, abstract.
Le, Quoc et al., "Distributed representations of sentences and documents," Proceedings of the $31^{st}$ International Conference on Machine Learning, 2014, pp. 1188-1196.
Lee, Mu-Chu et al., "Fast matrix-vector multiplications for large-scale logistic regression on shared-memory systems," Charu Aggarwal. ICDM, pp. 835-840, 2015.
Mesnil, Gregoire et al., "Ensemble of generative and discriminative techniques for sentiment analysis of movie reviews," CoRR, Dec. 19, 2014.
Mikolov, Tomas et al., "Distributed representations of words and phrases and their compositionality," Advances in Neural Information Processing Systems, 26 (2013) pp. 3111-3119.
Mikolov, Tomas et al., "Efficient estimation of word representations in vector space," CoRR, Sep. 7, 2013.
Mikolov, Tomas et al., "Recurrent neural network based language model," INTERSPEECH 2010, $11^{th}$ Annual Conference of the International Speech Communication Association, Sep. 26-30, 2010, pp. 1045-1048.
Mikolov, Tomas, "RNNLM Toolkit," RNNLM—recurrent neural network language modeling toolkit, IEEE Automatic Speech Recognition and Understanding Workshop, Dec. 2011.
Mikolov, Tomas, "Statistical language models based on neural networks," presentation at Brno University of Technology, Czech Republic, Apr. 2, 2012.
Mikolov, Tomas, "Statistical language models based on neural networks," Ph.D. thesis, 2012.
Nakov, Preslav et al., "Combining word-level and character-level models for machine translation between closely-related languages," Proceedings of the $50^{th}$ annual meeting of the Association for Computational Linguistics, Jul. 8-14, 2012, pp. 301-305.
Nobata, Chikashi et al., "Abusive language detection in online user content," WWW 2016, Apr. 11-15, 2016.
Paolacci, Gabriele et al., "Running experiments on Amazon Mechanical Turk," Judgment and Decision Making, 5(5):411-419, Aug. 2010.
Pitler, Emily et al., "Using syntax to disambiguate explicit discourse connectives in text," Proceedings of the ACL-IJCNLP 2009 Conference Short Papers, , Aug. 4, 2009, pp. 13-16.
Sapkota, Upendra et al., "Not all character N-grams are created equal: A study in authorship attribution," Proceedings of the 2015 Conference of the North American Chapter of the Association for Computational Linguistics: Human Language Technologies, May 31-Jun. 5, 2015, pp. 93-102.
Sood, Sara Owsley et al., "Profanity use in online communities," Proceedings of the SIGCHI Conference on Human Factors in Computing Systems, May 5-10, 2012, pp. 1481-1490.
Sood, Sara Owsley et al., "Using crowdsourcing to improve profanity detection," AAAI Spring Symposium: Wisdom of the Crowd, 2012.
Surdeanu, Mihai et al., "Learning to rank answers to non-factoid questions from web collections," Computational Linguistics, 37:351-383, 2011.
Suri, Siddharth et al., "Cooperation and contagion in web-based, networked public goods experiments," ACM SIGecom Exchanges, vol. 10, No. 2, Jun. 2011, pp. 3-8.
Tetreault, Joel et al., "A report on the first native language identification shared task," Proceedings of the Eighth Workshop on Innovative Use of NLP for Building Educational Applications, Jun. 13, 2013, pp. 48-57.
Wang, Sida et al., "Baselines and Bigrams: simple, good sentiment and topic classification," Proceedings of the $50^{th}$ Annual Meeting of the Association for Computational Linguistics, Jul. 8-14, 2012, pp. 90-94.
Warner, William et al., "Detecting hate speech on the world wide web," Proceedings of the 2012 Workshop on Language in Social Media (LSM 2012), Jun. 7, 2012, pp. 19-26.
Xiang, Guang et al., "Detecting offensive tweets via topical feature discovery over a large scale twitter corpus," Proceedings of the $21^{st}$ ACM International Conference on Information and Knowledge Management, CIKM'12, Oct. 29-Nov. 2, 2012, pp. 1980-1984.
Yang, Bishan et al., "Embedding entities and relations for learning and inference in knowledge bases," ICLR 2015 Conference paper, Dec. 2014.
Yarowsky, David, "Unsupervised word sense disambiguation rivaling supervised methods," Proceedings of the $33^{rd}$ annual meeting on Association for Computational Linguistics, 1995, pp. 189-196.
Yin, Dawei et al., "Detection of harassment on web 2.0," Proceedings of the Content Analysis in the Web, 2009, 2:107.

* cited by examiner

DETECTING ABUSIVE LANGUAGE USING CHARACTER N-GRAM FEATURES

BACKGROUND OF THE INVENTION

The present disclosure relates generally to computer implemented methods and apparatus for detecting abusive language. More particularly, the disclosure relates to detecting abusive language using character N-gram features.

The rise of online communities over the last ten years, in various forms such as message boards, twitter, discussion forums, etc., have allowed people from disparate backgrounds to connect in ways that would not have been possible before. However, the ease of communication online has made it possible for both anonymous and non-anonymous posters to hurl insults, bully, and threaten through the use of profanity and hate speech, all of which can be framed as "abusive language."

A number of methods exist for detecting abusive language. For example, detection of abusive language can be handled effectively through blacklists that identify specific words or phrases as abusive language. As another example, regular expressions may be used to identify language patterns that are correlated with abusive language. Unfortunately, users become familiar with these methods and find ways to evade the detection of abusive language.

SUMMARY OF THE INVENTION

Methods and apparatus for detecting abusive language in text are disclosed. In one embodiment, a set of character N-grams is ascertained for a set of text posted via the Internet. Feature values for a plurality of features of the set of text are determined, based, at least in part, on the set of character N-grams. A model is applied to the feature values for the plurality of features to generate a score for the set of text, where the model includes a plurality of weights, each of the weights corresponding to one of the features. It may then be determined whether the set of text includes abusive language based, at least in part, on the score.

In another embodiment, the invention pertains to a computing system comprising a processor and a memory. The computing system may be configured to perform one or more of the disclosed method operations. In another embodiment, the invention pertains to a computer readable storage medium having computer program instructions stored thereon that are arranged to perform one or more of the disclosed method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
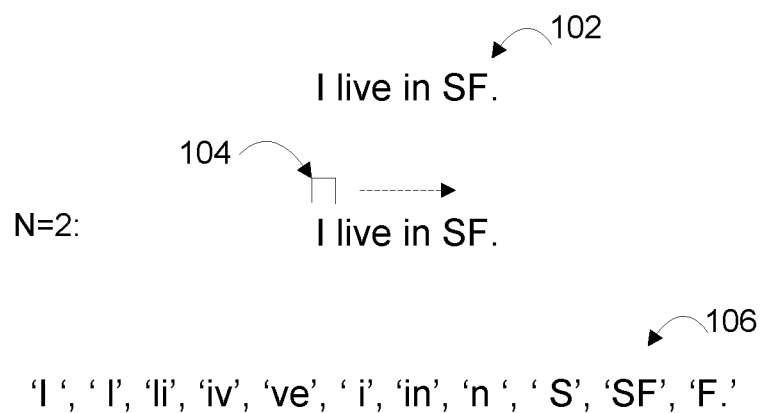
FIG. 1 is a diagram illustrating an example of character N-grams.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Detection of abusive language in user-generated online content has become an issue of increasing importance in recent years. Most current commercial methods make use of blacklists and regular expressions. However these measures fall short when contending with more subtle examples of hate speech.

Anytime one engages online, whether on message board forums, comments, or social media, there is always a risk that he or she will be the target of ridicule and even harassment. To combat abusive language, many Internet companies have standards and guidelines that users must adhere to and they employ human editors, in conjunction with systems which use regular expressions and blacklists, to identify abusive language and thus remove a post. As people increasingly communicate online, the need for high quality automated abusive language classifiers becomes much more profound. Recent cases highlight the impact of hurtful language in online communities, as well as on major corporations.

Abusive language can include various types of terms or phrases. For example, abusive language can include profanity, hate speech, derogatory language, or insulting terminology, which may be directed to a particular ethnic or religious group.

Detecting abusive language can be a difficult task for a variety of reasons. The noisiness of the data and the intentional obfuscation of words and phrases to evade manual or automatic checking often makes this a challenging task to automate. Since there are many permutations for a source word or phrase, it is impossible for simple keyword spotting metrics to be successful. Conversely, the use of keyword spotting could lead to false positives. It is also extremely difficult to track all racial and minority insults. Moreover, even if a relatively comprehensive blacklist containing a collection of words considered to be abusive were compiled, such lists are not static and are ever changing. Furthermore, some insults which might be unacceptable to one group may be considered inoffensive to another group. Thus, the context of a particular word or phrase is significant.

While there are many examples on the Internet of abusive language being very noisy, there are many cases where abusive language is quite grammatical. In addition, abusive language is often not limited to a single sentence. In some cases, it is important to analyze other sentences adjacent to or surrounding the sentence to decide whether the text is abusive.

Moreover, sarcastic comments are often posted in the same voice as the people that post abusive language. This is a very difficult task for humans or machines to get correct as it requires knowledge of the community and potentially even the users themselves.

In accordance with various embodiments, abusive language may be detected in text posted on the Internet based, at least in part, upon N-grams identified within the text. In the following description, text posted online by a user may also be referred to as a comment. A comment may include any text that is posted via a web site. For example, the comment may be posted on a Blog, message board forums, in relation to an article, a photograph, etc. A date and/or time at which the comment is submitted via the web site or posted via the web site may be stored in association with the comment.

An N-gram is a contiguous sequence of n items from a given sequence of text or speech. The items can be phonemes, syllables, characters (e.g., letters), words, or base pairs. In one embodiment, the items are single characters. For example, a character may be a letter or punctuation mark.

In accordance with various embodiments, abusive language may be detected in online comments using character N-grams. FIG. 1 is a diagram illustrating an example of character N-grams. In this example, the posted comment is a single sentence 102. To visualize a process of identifying character N-grams within a comment, a window 104 having a character length equal to N may be passed over the sentence. For example, where the sentence 102 is "I live in SF" and N=2, the bi-grams 'I', 'I', 'li', 'iv', 'ye', 'i', 'in', 'n', 'S', 'SF', 'F.' 106 are identified. Thus, the character N-grams include all combinations of adjacent letters of length N within the comment. Stated another way, each character N-gram is an N-tuple or group of n characters that are adjacent to one another. In this example, all characters including blank spaces within the comment (e.g., between words or sentences) are counted or recognized to identify the character N-grams. However, in other embodiments, some characters such as blank spaces may be excluded from the identification of character N-grams.

The character N-grams identified in this example do not include duplicates. However, where N-grams identified for a particular comment include duplicates, the duplicate N-grams may be eliminated. In one embodiment, a count associated with a character N-gram may be incremented to indicate the number of times a character N-gram occurs within the comment.

For example, an array representing a count for each of the character N-grams identified for a particular comment may be maintained, as follows:

[1, 1, 1 . . . ]

In this example, the count for each N-gram is 1. However, for other comments, the counts for the identified N-grams may vary.

Figure 2:
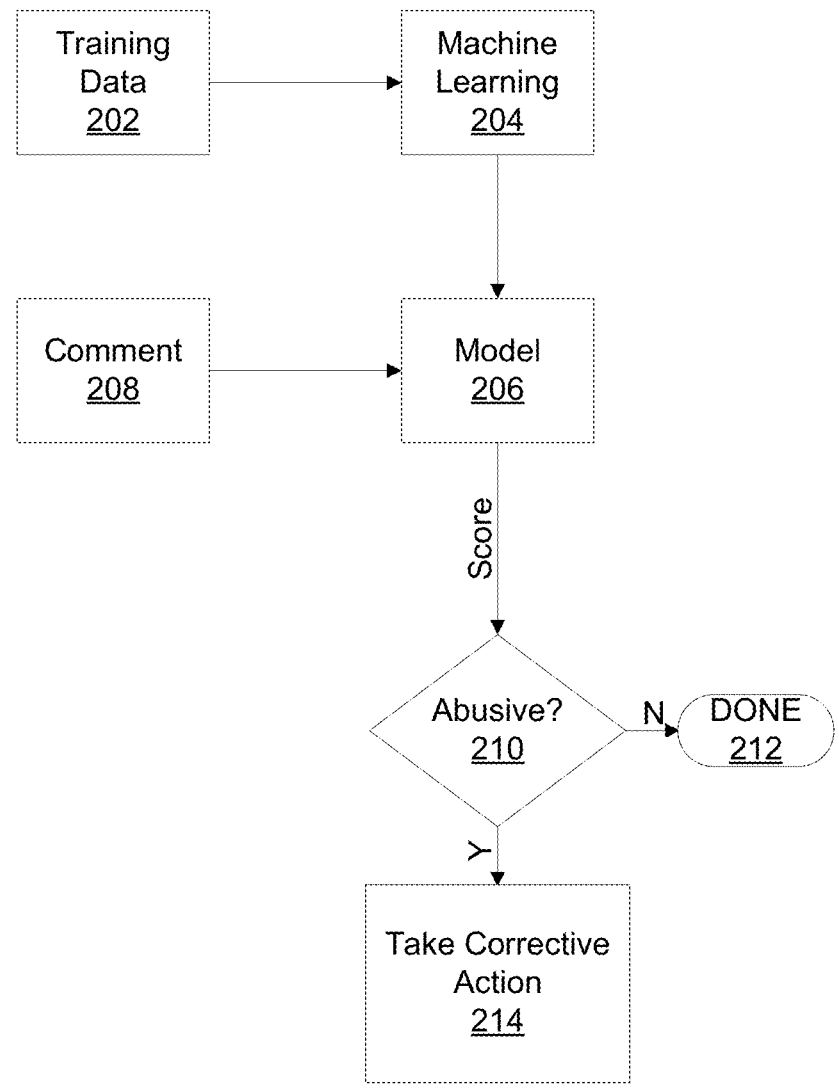
FIG. 2 is a block diagram illustrating an example system in which various embodiments may be implemented.

FIG. 2 is diagram illustrating a system in which various embodiments may be implemented. Training data 202 may be input to a machine learning algorithm 204 to train a machine learning model 206. The training data 202 may correspond to a plurality of comments. In one embodiment, the training data 202 may consist of comments that contain abusive language. In other embodiments, the training data 202 may further include comments that do not contain abusive language. Each comment in the training data 202 may be tagged to indicate whether the comment contains abusive language. For example, each comment in the training data 202 may be tagged to indicate whether the comment is classified as containing abusive language or clean.

Each instance within the training data 202 may include a value for each one of a plurality of features. More particularly, the features may include at least one feature determined, at least in part, on character N-grams identified in a corresponding comment. For example, the features may indicate an identity of each N-gram in the corresponding comment and/or the number of occurrences of the N-gram within the comment. In addition, the features may include syntactic, semantic, and/or linguistic features, as will be described in further detail below.

N-grams may be collected for a text corpus. For example, N-grams may be collected from comment(s) posted online via one or more web sites. For example, the comment(s) may be posted via a Blog, message board forum, or in relation to a media item such as an article or photograph.

Model 206 may include a weight for each of the features. Feature values for a comment 208 may be input into model 206, which generates a score that can be used to classify the comment 208 as abusive or not abusive (e.g., clean). More particularly, each of the feature values may correspond to a different one of a plurality of features of the comment 208. If the comment 208 is not classified as abusive, no further action need be performed 212. However, if the comment 208 is classified as abusive, corrective action 214 may be taken. For example, the comment 208 may be flagged as abusive or deleted (e.g., removed from a Blog or web site).

An automated abusive language classifier may be implemented to detect abusive language in comments posted via the Internet. One example of an implementation of an automated abusive language classifier is described in further detail below with reference to FIG. 3.

Figure 3:
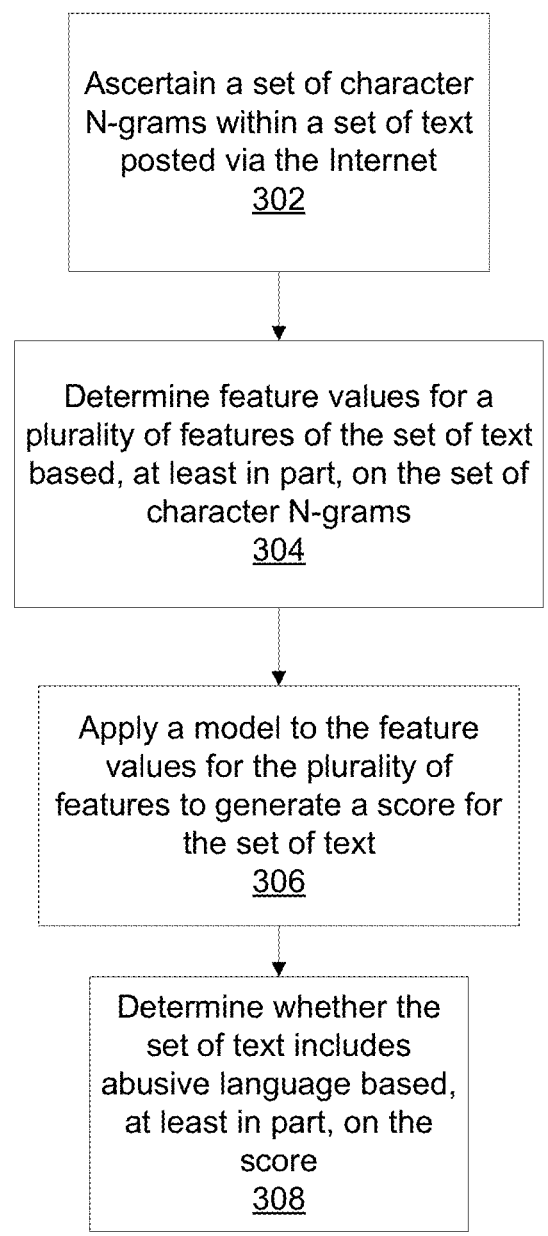
FIG. 3 is a process flow diagram illustrating an example method of detecting abusive language according to various embodiments.

FIG. 3 is a process flow diagram illustrating an example method of detecting abusive language according to various embodiments. A set of character N-grams within a set of text may be ascertained at 302. For example, the set of text may be a comment posted via the Internet. In one embodiment, N is greater than 0 and less than 10.

Feature values for a plurality of features of the set of text may be determined based, at least in part, on the set of character N-grams at 304. More particularly, each of the feature values may correspond to a different one of the plurality of features. For example, the feature values may indicate, for each of the character N-grams in the set of N-grams, a value of each of one or more N-gram features. For example, the N-gram features can indicate an identity of the character N-gram and/or a count associated with character N-gram that indicates the number of times that the N-gram occurs within the comment, The features may also include syntactic feature(s), semantic feature(s), and/or linguistic feature(s). Examples of various features that may be employed will be described in further detail below.

A model is applied to the feature values of the features for the comment to generate a score for the set of text at 306. The model includes a plurality of weights, and where each of the weights corresponds to one of the features. As described above, the model may be generated based, at least in part, on a training set of comments, where each comment in the training set has a set of values that correspond to the features.

It may be determined whether the set of text includes abusive language based, at least in part, on the score at 308. The set of text may be classified as abusive or clean based, at least in part, on the score. For example, a score that exceeds a particular threshold value may indicate that the comment contains abusive language. As another example, where the score is less than a given threshold value, the set of text may be classified as clean.

Linguistic Features

Linguistic features may be used to further handle the noisiness of the data. The linguistic features may be used to look for inflammatory words (e.g., a pre-determined list of hate words). In addition, the linguistic features may be used to identify elements of non-abusive language such as the use of politeness words or modal verbs.

A politeness word may be a word that is used to show the reader that the reader is valued or respected. Alternatively, a politeness word may be used to change or soften a comment so as not to appear too direct or forceful. For example, politeness words may include please, may, thank you, excuse me, Mr., etc.

A modal verb is a type of auxiliary verb that is used to indicate modality. A modal verb can be used to express: likelihood, possibility, ability, permission, or obligation. Examples include the verbs can/could, may/might, must, will/would, and shall/should. The number of unknown words within the comment may indicate intentional and/or unintentional misspellings of words. A modal phrase is a combination of auxiliary verbs and the preposition to.

A comment may include any number of tokens. A token may be a string of characters (e.g., separated by space(s)).

Linguistic features may include a length of the comment in tokens (e.g., individual characters), an average length of a word in the comment, a number (e.g., count) of punctuation marks in the comment, a number of a particular type of punctuation mark (e.g., period, question mark, quotes, or repeated punctuation) in the comment, a number of one letter tokens in the comment, a number of capitalized letters in the comment, a number of Uniform Resource Locators (URLs) in the comment, a number of tokens in the comment having non-alphabetical characters in the middle of the tokens, a number of discourse connectives (e.g., but, moreover, therefore, so etc.) in the comment, a number of politeness words in the comment, a number of modal verbs or phrases in the comment (e.g., to measure hedging and confidence of the user that submitted the comment), a number of unknown words in the comment (e.g., as compared to a dictionary of words), and/or a number of blacklisted words (e.g., insult or hate words) within the comment. The number of unknown words within the comment may indicate intentional and/or unintentional misspellings of words.

Discourse connectives are words or phrases that connect or relate two coherent sentences or phrases and indicate the presence of discourse relations. Explicit discourse relations in text are signaled by discourse connectives such as since, because, however, etc.

Syntactic Features

Syntactic features may include words within a comment, parts of speech (POS) tags indicating parts of speech of the words within the comment, and/or dependency relations among the words within the comment. Example syntactic features include, but are not limited to, parent of node, grandparent of node, POS of parent, POS of grandparent, children of node, a tuple consisting of the word, parent, and grandparent, and tuples consisting of the permutations of the word or its POS, the dependency label connecting the word to its parent, and the parent or its POS. Syntactic features may capture long-range dependencies between words which n-grams may not be able to capture.

In one embodiment, a graph or tree representing the comment is generated. The syntactic features may be determined using the graph or tree.

Semantic Features

To obtain embeddings of comments, distributed representations may be learned for the comments. For example, comments may be represented as low-dimensional dimensional vectors and may be learned with distributed vector representations of tokens using a distributed memory model. More particularly, the content of comments may be leveraged to model word sequences within them. While the word vectors contribute to predict the next word in comments, comment vectors may also be used to predict the next word in comments.

In one embodiment, a comment embeddings model maps each comment to a unique vector in a matrix representing comments and each word is mapped to a unique vector in a matrix representing words. Comment vectors and word vectors may be used to predict the next word in a context. More particularly, the probability distribution of observing a word depends not only on the fixed number of surrounding words, but also depends on the specific comment. In this way, each comment may be represented by a dense low-dimensional vector which is used to predict words in the comment and overcomes the weaknesses of word embeddings solely.

Network Environment

Figure 4:
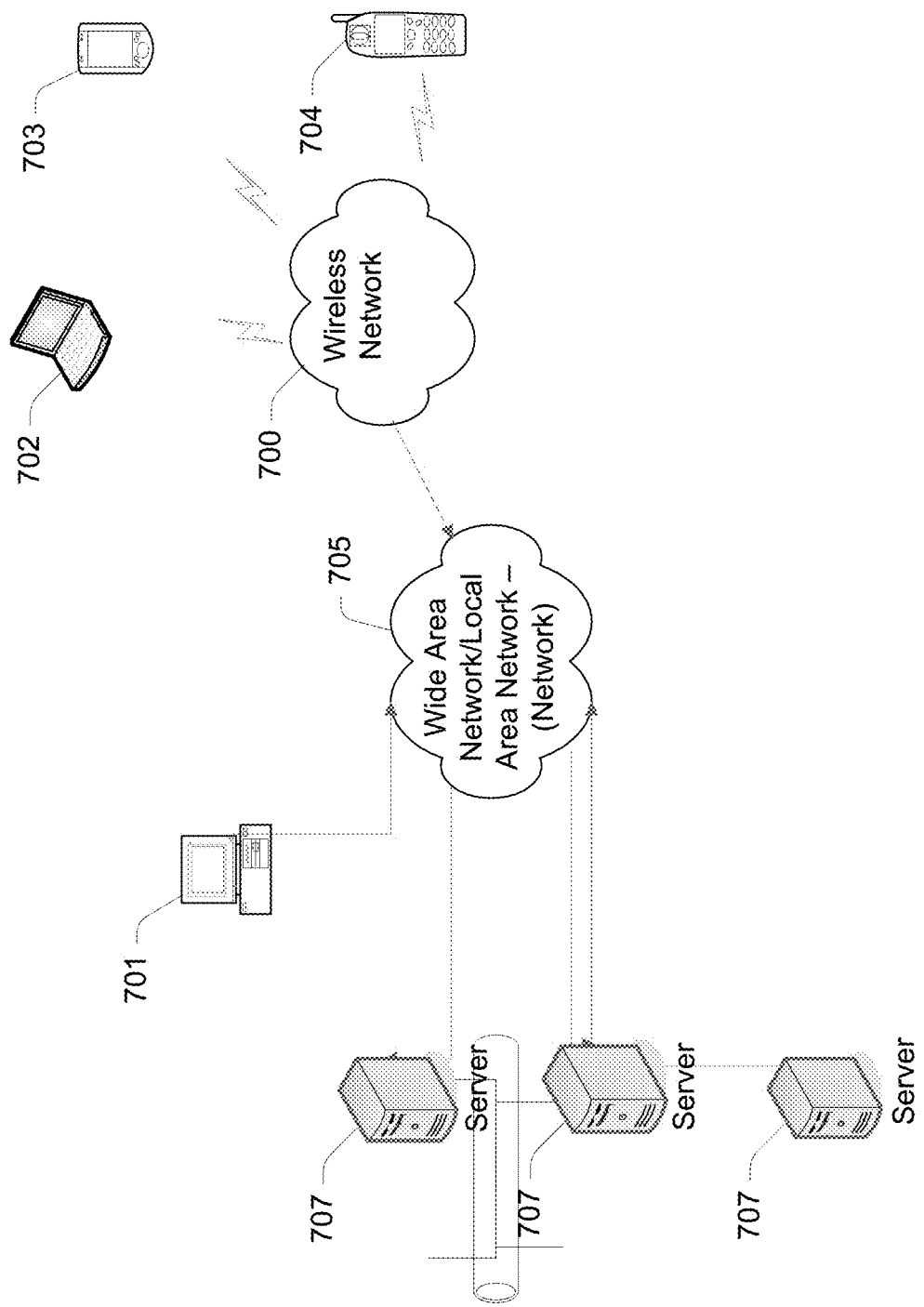
FIG. 4 is a schematic diagram illustrating an example embodiment of a network in which various embodiments may be implemented.

The disclosed embodiments may be implemented in any of a wide variety of computing contexts. FIG. 4 is a schematic diagram illustrating an example embodiment of a network. Other embodiments that may vary, for example, in terms of arrangement or in terms of type of components, are also intended to be included within claimed subject matter.

Implementations are contemplated in which users interact with a diverse network environment via any type of computer (e.g., desktop, laptop, tablet, etc.), media computing platforms (e.g., cable and satellite set top boxes and digital video recorders), handheld computing devices (e.g., PDAs), cell phones, or any other type of computing or communication platform.

As shown, FIG. 4, for example, includes a variety of networks, such as a LAN/WAN 705 and wireless network 700, a variety of devices, such as client devices 701-704, and a variety of servers 707 such as content server(s), a web server, and/or a search server. As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 4 by server (s) 707, which may correspond to multiple distributed devices and data store(s). The server(s) 707 and/or corresponding data store(s) may store user account data, user information, training data, comments, feature values, and/or content. The server(s) 707 may be further configured to operate according to various embodiments described herein.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content items may be identified and retrieved via a content distribution network. A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Services may also be provided in a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

The network environment may include a wireless network that couples client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Communications transmitted via a network typically include signal packets. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Various embodiments may be employed via one or more servers. A computing device that is capable of sending or receiving signals, such as via a wired or wireless network, or capable of processing or storing signals, such as in memory as physical memory states, may operate as a server. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content items may be identified or provided via a content server. A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOW) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 5:
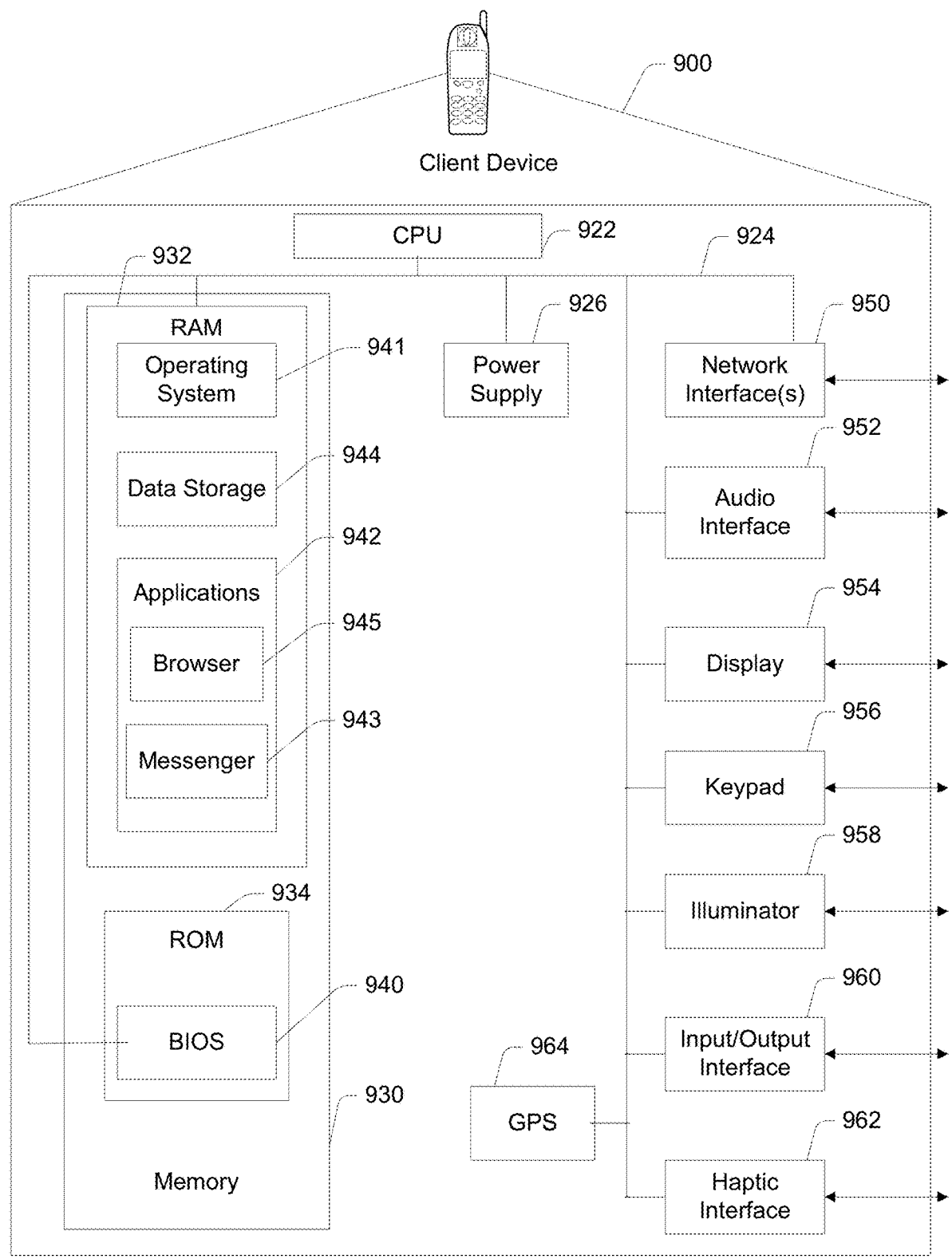
FIG. 5 is a diagram illustrating an example client device in which various embodiments may be implemented.

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application such as messenger 943, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 900 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. The client device 900 may include an audio interface 952. In addition, the client device 900 may include a display 954 and an illuminator 958. The client device 900 may further include an Input/Output interface 960, as well as a Haptic Interface 962 supporting tactile feedback technology.

The client device 900 may vary in terms of capabilities or features. Claimed subject matter is intended to cover a wide range of potential variations. For example, a cell phone may include a keypad such 956 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 964 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print. From the identity of the user, a user profile and/or client profile may be identified or obtained.

Regardless of the system's configuration, it may employ one or more memories or memory modules configured to store data, program instructions for the general-purpose processing operations and/or the inventive techniques described herein. For example, the program instructions may control the operation of one or more applications. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    ascertaining, for a set of text posted via the Internet, an initial set of character N-grams within the set of text;
    eliminating one or more duplicate character N-grams in the initial set of character N-grams to generate a set of character N-grams;
    determining feature values for a plurality of features of the set of text based, at least in part, on the set of character N-grams, the plurality of features including one or more syntactic features indicative of a first identity of a first N-gram within the set of text, one or more linguistic features indicative of a second identity of a second N-gram within the set of text, and one or more semantic features indicative of a third identity of a third N-gram within the set of text;
    applying a machine learning model to the feature values for the plurality of features to generate a score for the set of text, wherein the machine learning model includes a plurality of weights, wherein the plurality of weights comprises a first weight corresponding to at least one feature of the one or more syntactic features, a second weight corresponding to at least one feature of the one or more linguistic features and a third weight corresponding to at least one feature of the one or more semantic features, wherein the applying comprises (i) applying the first weight to the at least one feature of the one or more syntactic features indicative of the first identify of the first N-gram, (ii) applying the second weight to the at least one feature of the one or more linguistic features indicative of the second identify of the second N-gram, and (iii) applying the third weight to the at least one feature of the one or more semantic features indicative of the third identify of the third N-gram, wherein the applying the first weight, the applying the second weight and the applying the third weight is used to generate the score for the set of text comprising the first N-gram, the second N-gram and the third N-gram;
    determining whether the set of text includes abusive language based, at least in part, on the score; and
    responsive to determining that the set of text includes abusive language based, at least in part, on the score exceeding a threshold value associated with abusive language, deleting the set of text.

2. The method as recited in claim 1, comprising:
    generating the machine learning model based, at least in part, on a training set of comments, each comment in the training set of comments having a feature value for each feature of the plurality of features.

3. The method as recited in claim 2, wherein each comment in the training set of comments includes at least some abusive language.

4. The method as recited in claim 1, comprising:
    generating at least one of a graph or a tree representing the set of text; and
    determining the one or more syntactic features based, at least in part, on at least one of the graph or the tree.

5. The method as recited in claim 1, wherein the plurality of features comprise a count indicating a number of times that one or more N-grams occur within the set of text.

6. The method as recited in claim 1, wherein the one or more linguistic features are used to identify one or more elements of non-abusive language comprising one or more politeness words.

7. A computer program product comprising one or more non-transitory computer-readable media having computer program instructions stored therein, the computer program instructions being configured such that, when executed by one or more computing devices, the computer program instructions cause the one or more computing devices to:

ascertain, for a set of text posted via the Internet, an initial set of character N-grams within the set of text;
eliminate one or more duplicate character N-grams in the initial set of character N-grams to generate a set of character N-grams;
determine feature values for a plurality of features of the set of text based, at least in part, on the set of character N-grams, the plurality of features including at least two of: one or more syntactic features indicative of a first identity of a first N-gram within the set of text, one or more linguistic features indicative of a second identity of a second N-gram within the set of text, or one or more semantic features indicative of a third identity of a third N-gram within the set of text;
apply a machine learning model to the feature values for the plurality of features to generate a score for the set of text, wherein the machine learning model includes a plurality of weights, wherein the plurality of weights comprises at least two of a first weight corresponding to at least one feature of the one or more syntactic features, a second weight corresponding to at least one feature of the one or more linguistic features or a third weight corresponding to at least one feature of the one or more semantic features, wherein the applying comprises at least two of (i) applying the first weight to the at least one feature of the one or more syntactic features indicative of the first identify of the first N-gram, (ii) applying the second weight to the at least one feature of the one or more linguistic features indicative of the second identify of the second N-cram, or (iii) applying the third weight to the at least one feature of the one or more semantic features indicative of the third identify of the third N-cram, wherein at least two of the applying the first weight, the applying the second weight or the applying the third weight is used to generate the score for the set of text comprising the first N-gram, the second N-gram and the third N-gram;
determine whether the set of text includes abusive language based, at least in part, on the score; and
responsive to determining that the set of text includes abusive language based, at least in part, on the score exceeding a threshold value associated with abusive language, delete the set of text.

8. The computer program product as recited in claim 7, the computer program instructions being configured to:
generate the machine learning model based, at least in part, on a training set of comments, each comment in the training set of comments having a feature value for each feature of the plurality of features.

9. The computer program product as recited in claim 8, wherein each comment in the training set of comments includes at least some abusive language.

10. The computer program product as recited in claim 7, the computer program instructions being configured to:
generate at least one of a graph or a tree representing the set of text; and
determine the one or more syntactic features based, at least in part, on at least one of the graph or the tree.

11. The computer program product as recited in 7, wherein N is less than 10.

12. An apparatus, comprising:
at least one processor; and
at least one memory storing thereon computer-readable instructions configured to: ascertain, for a set of text posted via the Internet, an initial set of character N-grams within the set of text;
eliminate one or more duplicate character N-grams in the initial set of character N-grams to generate a set of character N-grams;
determine feature values for a plurality of features of the set of text based, at least in part, on the set of character N-grams, the plurality of features including at least two of: one or more syntactic features indicative of a first identity of a first N-gram within the set of text, one or more linguistic features indicative of a second identity of a second N-gram within the set of text, or one or more semantic features indicative of a third identity of a third N-gram within the set of text;
apply a machine learning model to the feature values for the plurality of features to generate a score for the set of text, wherein the machine learning model includes a plurality of weights, wherein the plurality of weights comprises at least two of a first weight corresponding to at least one feature of the one or more syntactic features, a second weight corresponding to at least one feature of the one or more linguistic features or a third weight corresponding to at least one feature of the one or more semantic features, wherein the applying comprises at least two of (i) applying the first weight to the at least one feature of the one or more syntactic features indicative of the first identify of the first N-gram, (ii) applying the second weight to the at least one feature of the one or more, linguistic features indicative of the second identify of the second N-cram, or (iii) applying the third weight to the at least one feature of the one or more semantic features indicative of the third identify of the third N-gram, wherein at least two of the applying the first weight, the applying the second weight or the applying the third weight is used to generate the score for the set of text comprising the first N-gram, the second N-gram and the third N-gram; and
determine whether the set of text includes abusive language based, at least in part, on the score.

13. The apparatus as recited in claim 12, the computer-readable instructions being configured to:
generate the machine learning model based, at least in part, on a training set of comments, each comment in the training set of comments having a feature value for each feature of the plurality of features.

14. The apparatus as recited in claim 13, wherein each comment in the training set of comments includes at least some abusive language.

15. The apparatus as recited in claim 12, the computer-readable instructions being configured to:
generate at least one of a graph or a tree representing the set of text; and
determine the one or more syntactic features based, at least in part, on at least one of the graph or the tree.

16. The apparatus as recited in claim 12, wherein the set of text is a comment posted on at least one of a blog, a message board forum, an article or a photograph.

17. The apparatus as recited in claim 12, wherein N is less than 10.

18. The method as recited in claim 1, the one or more syntactic features including one or more of: parts of speech tags indicating parts of speech of words within the set of text or dependency relations among words within the set of text.

19. The method as recited in claim 1, the one or more linguistic features including one or more of: a length of the set of text in tokens, an average length of a word in the set of text, a number of punctuation marks in the set of text, a number of a particular type of punctuation mark in the set of text, a number of one letter tokens in the set of text, a number of capitalized letters in the set of text, a number of Uniform Resource Locators (URLs) in the set of text, a number of tokens in the set of text having non-alphabetical characters in a middle of the tokens, a number of discourse connectives in the set of text, a number of politeness words in the set of text, a number of modal verbs or phrases in the set of text, a number of unknown words in the set of text, or a number of blacklisted words within the set of text.

20. The apparatus as recited in claim 12, the plurality of features including a count indicating a number of times that one or more N-grams occur within the set of text.

* * * * *